United States Patent Office 3,234,193
Patented Feb. 8, 1966

3,234,193
PREPARATION OF LITHIATED STYRENE
POLYMERS
Frederick C. Leavitt, Framingham, Mass., assignor to
The Dow Chemical Company, Midland, Mich., a corporation of Delaware
No Drawing. Filed Dec. 31, 1959, Ser. No. 863,080
5 Claims. (Cl. 260—87.5)

This invention relates to the preparation of polymers generally of a linear structure, but containing branches in the molecular arrangement providing reaction sites for the addition of lithium so that lithium can be covalently bound directly to the organic sub-strate.

For the preparation of organic polymer materials of unique structures involving grafting of diversified units together and also the inclusion of metals within the organic structure, no techniques are available to manufactures. In other words, polymers, in general, are prepared by the random polymerization of monomeric units or the random copolymerization of a plurality of different monomer units. In the present state of manufacture, little control can be exercised over the arrangement of the monomer units in a copolymer molecule or over crosslinking between polymer molecules of any kind. Generally, it is safe to say, therefore, that preparation of polymers from monomeric units is a somewhat empirical process wherein the ultimate construction of the polymer is left to statistical probabilities.

It is an object of this invention to provide a technique by which single monomer units can be polymerized and to have the linear polymers in a form suitable to prepare a polylithiated molecule which serves as a base for further processes which take advantage of these many highly reactive sites on the molecule. It is, accordingly, a basic object of the invention to provide a process for the preparation of graft polymers and polymers containing metals covalently bound to the organic substrate material.

Other objects and advantages of the invention will in part be obvious and in part appear hereinafter.

The invention, accordingly, is concerned with a process for preparing lithiated polymers from olefinic compounds carrying reactive pendant groups so that polymerization when carried out, will form a polymeric compound which can thereafter be reacted with an organic lithium compound so that the lithium is added to the polymer, thereby providing active reaction sites for catalysis of reactions and preparation of graft polymers and metal compounds.

Preferable linear compounds or linear polymers for use in the process of this invention are the polymers of vinyl-type compounds, principally substituted vinyl types such as styrene, and substituted styrene containing a pendant reactive group such as a halogen atom so that the polymer chain formed by the reaction of the vinyl groups carries a halogen at intervals along its length. Thereby, there is formed a molecule, fundamentally of linear character, useful as such. For example, parabromostyrene, polymerized to form polyparabromostyrene is a useful composition consisting of a high molecular weight linear polymer carrying the parabromophenyl radical at intervals along the chain.

The composition is useful, depending upon the molecular weight and purpose for which the material is to be used. Where the parabromostyrene is copolymerized with styrene or a simple olefinic compound to form a copolymer having a lesser number of brominated pendant groups, the properties of the ultimate compound are different, depending upon the molecular weight, but the fundamental structure of the linear polymer with the side chains, or reactive pendant groups, remains.

It is the preparation of compounds having this basic linear structure carrying halogen at intervals along its length and the reaction of such monomers or polymers with a lithium organic compound, such as butyl lithium, to form compounds, wherein the lithium replaced the halogen, which characterizes the invention. In more general form therefore, the reaction may be stated as follows:

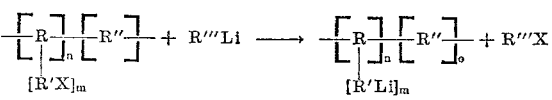

wherein: R is any unit of a polymeric chain of fundamentally linear form; R' is any connecting moiety unit, which may also be absent, leaving X or Li connected directly to R; X is any halogen atom; R" is any unit of a polymer chain, occurring in any sequence, including no occurrence; and R''' is any organic radical.

In general the ratio of copolymerization, measured by the ratio of $n:o$, may be any value, from 1:0, i.e., the case of simple polymer to, 1:100, the case where the monomer carrying the pendant side chain is present in minor amount. As in any polymerization the degree may be up to 10,000 or more monomer units. Since pendant side chains are a desired part of the structure, $m$ is preferably equal to $n$, but is also in the same numerical range.

Details of the process may be illustrated specifically by the following example:

Four milliliters of a 1.25 N solution of butyl lithium in hexane is placed in a closed glass flask with an atmosphere of dry nitrogen and a stirrer. Seventy milliliters of a 1% (by weight) solution of polyparabromostyrene in dry tetrahydrofuran (THF) is slowly added over a period of 15 minutes at a temperature of —25° C. After an initial cloudiness due to the low solvent power of the hexane, a clear solution of the lithiated polymer in the THF-hexane is obtained. Upon subsequent hydrolysis and purification, the polymeric product contained 2.1% bromine compared to approximately 45% in the starting material. Therefore, ca. 95% of the Br atoms has been replaced with Li during the reaction.

The polyparabromostyrene of the example had a degree of polymerization of about 500–1000. However, the reaction can be carried out with polymers of virtually any molecular weight to the limit of solubility of the polymer in a solvent. Similarly, copolymers of parabromostyrene and styrene may be used under the conditions outlined, using materials of virtually any molecular weight. Alkyl lithium of relatively low molecular weight is a preferred reactant; i.e., the alkyl group with 2–6 carbon atoms. Metallic lithium, emulsified in a carrier or suspended in finely divided form in an inert carrier, such as hexane, also is useful.

Though in general, I prefer the brominated raw materials, any halogenated monomer or polymer having the fundamental linear-pendant-side-chain structure is useful. The usual structure interposes a hydrocarbon moiety between the halogen and the polymer chain, but, as long as the halogen is present pendant from the polymeric chain the compound will react as indicated.

Where lithiating agent is being varied, it should be matched against the reactivity of the halogenated polymer; thus, the relatviely unreactive phenyl-lithium would be useful with a polymer having a very reactive halogen atom, such as, poly(para-vinyl benzyl bromide). Polar inert solvents such as diethyl ether, or tetrahydrofuran are best.

Other useful combinations of reactants are: polyorthobromo-styrene with butyllithium to produce polyortholithium styrenes; orthobromo styrene copolymerized with styrene (any ratios) reacted with butyl lithium to produce the lithiated copolymer; meta bromo styrene, polymerized, and reacted with butyl lithium to produce the corresponding polymeta lithio styrene; meta bromo styrene copolymerized with styrene reacted with butyl lithium to form the corresponding meta lithiated styrene-styrene copolymer.

In carrying out the reaction, regardless of which combination of reactants is used, it is important to employ a temperature low enough so that the lithiating agent will not react with the solvent. That is, control of the reactant to obtain maximum yield of the lithiated polymer as reacted is desirable not only by means of the reactant materials, but by means of solvent and control of temperature. In general, the preferred reaction temperature range is from about −10° C. to about −80° C., the preferred level being determined by the solvent and the reactant combination. In general, the higher temperature ranges provide faster reaction, but inasmuch as the materials are all highly reactive, there is no problem in inducing reaction.

Proportionation of reactants should be at least stoichiometric, but in general, an excess of the lithiating agent will be preferred in order to minimize cross-linking of the polymer. In other words, since the reaction mechanism postulated is one in which the lithium replaces the bromine to leave an organo-lithium moiety capable of further reaction with another bromine on an adjacent polymer chain, distinct possibility for cross-linking exists and this is minimized by employing an excess of the lithiating agent. By following the practice of the example, or the variants indicated, yields of lithiated polymers are fundamentally quantitative.

Though the invention has been described with reference to only a few examples, it is to be understood that variants thereof may be developed without departing from its spirit or scope.

What is claimed is:

1. A linear polymer of vinyl benzene monomer unit selected from the group consisting of ortholithiostyrene, metalithiostyrene, paralithiostyrene and copolymers thereof with styrene, said polymer being such that the ratio of the lithiated styrene to styrene is in the range of 1:0 to 1:100; the molecular weight of the polymers being in the range 1000–10,000 monomer units.

2. A polymer in accordance with claim 1, in which the repeating unit is paralithiostyrene.

3. A polymer in accordance with claim 1, in which the repeating unit is paralithiostyrene copolymerized with styrene.

4. A polymer in accordance with claim 1, in which the repeating unit is ortholithiostyrene.

5. A polymer in accordance with claim 1, in which the repeating unit is meta lithiostyrene.

References Cited by the Examiner

UNITED STATES PATENTS 2,618,628  11/1952  Hayes _____ 260—91.5

OTHER REFERENCES

Bachman et al.: J.A.C.S., pages 1964–5, 73 (1951).
Rosenberg: J.A.C.S., pages 4389–90, 76 (1954).

JOSEPH L. SCHOFER, *Primary Examiner.*

HAROLD N. BURNSTEIN, LOUISE P. QUAST, JOSEPH R. LIBERMAN, WILLIAM H. SHORT, *Examiners.*